(12) United States Patent
Yi

(10) Patent No.: US 10,064,080 B2
(45) Date of Patent: Aug. 28, 2018

(54) METHOD AND APPARATUS FOR WIRELESS COMMUNICATION

(71) Applicant: LG ELECTRONICS INC., Seoul (KR)

(72) Inventor: Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/031,648

(22) PCT Filed: Oct. 28, 2014

(86) PCT No.: PCT/KR2014/010217
§ 371 (c)(1),
(2) Date: Apr. 22, 2016

(87) PCT Pub. No.: WO2015/065030
PCT Pub. Date: May 7, 2015

(65) Prior Publication Data
US 2016/0255523 A1    Sep. 1, 2016

Related U.S. Application Data

(60) Provisional application No. 61/896,630, filed on Oct. 28, 2013, provisional application No. 61/925,194, (Continued)

(51) Int. Cl.
*H04W 24/08* (2009.01)
*H04W 48/16* (2009.01)
(Continued)

(52) U.S. Cl.
CPC .......... *H04W 24/08* (2013.01); *H04W 48/16* (2013.01); *H04W 52/0206* (2013.01);
(Continued)

(58) Field of Classification Search
None
See application file for complete search history.

(56) References Cited

U.S. PATENT DOCUMENTS

2004/0081125 A1    4/2004 Ranta-Aho et al.
2004/0087320 A1    5/2004 Kim et al.
(Continued)

FOREIGN PATENT DOCUMENTS

CN    102883408    1/2013
KR    1020120031825    4/2012
(Continued)

OTHER PUBLICATIONS

PCT International Application No. PCT/KR2014/010217, International Search Report dated Jan. 8, 2015 2 pages.
(Continued)

*Primary Examiner* — Diane Lo
(74) *Attorney, Agent, or Firm* — Lee Hong Degerman Kang Waimey

(57) ABSTRACT

Operations of a UE and eNB are provided when there is a cell which can perform cell on/off. In this case, the UE may performs receiving signal on downlink channel and processing with the signal on the downlink channel. In addition, the signal on the downlink channel may includes a discovery signal when the cell is off-state, and the discovery signal is a signal used for cell identification and/or measurement.

12 Claims, 10 Drawing Sheets

Related U.S. Application Data filed on Jan. 8, 2014, provisional application No. 62/035,357, filed on Aug. 8, 2014, provisional application No. 62/054,985, filed on Sep. 25, 2014.

(51) Int. Cl.
| | | |
|---|---|---|
| *H04W 76/28* | (2018.01) | |
| *H04W 52/02* | (2009.01) | |
| *H04L 12/18* | (2006.01) | |
| *H04W 4/06* | (2009.01) | |

(52) U.S. Cl.
CPC .......... *H04W 76/28* (2018.02); *H04L 12/189* (2013.01); *H04W 4/06* (2013.01); *Y02D 70/00* (2018.01); *Y02D 70/1242* (2018.01); *Y02D 70/1262* (2018.01); *Y02D 70/1264* (2018.01); *Y02D 70/21* (2018.01); *Y02D 70/23* (2018.01); *Y02D 70/24* (2018.01); *Y02D 70/25* (2018.01)

(56) References Cited

U.S. PATENT DOCUMENTS

| | | |
|---|---|---|
| 2004/0229629 A1 | 11/2004 | Yi et al. |
| 2005/0007971 A1 | 1/2005 | Jeong et al. |
| 2005/0237961 A1 | 10/2005 | Yi et al. |
| 2008/0002638 A1 | 1/2008 | Saarela |
| 2008/0081598 A1 | 4/2008 | Chandra et al. |
| 2008/0171568 A1 | 7/2008 | Choi et al. |
| 2008/0298514 A1 | 12/2008 | Jones |
| 2009/0245155 A1 | 10/2009 | Fukunaga et al. |
| 2009/0252073 A1 | 10/2009 | Kim et al. |
| 2009/0310503 A1 | 12/2009 | Tenny et al. |
| 2010/0302983 A1 | 12/2010 | McBeath et al. |
| 2010/0330989 A1 | 12/2010 | Song et al. |
| 2010/0330992 A1 | 12/2010 | Bhattacharjee et al. |
| 2011/0128865 A1 | 6/2011 | Doppler et al. |
| 2011/0183663 A1 | 7/2011 | Kenehan et al. |
| 2011/0228666 A1 | 9/2011 | Barbieri et al. |
| 2011/0256833 A1 | 10/2011 | Racz et al. |
| 2012/0015657 A1 | 1/2012 | Comsa et al. |
| 2012/0028674 A1 | 2/2012 | Zhao |
| 2012/0082064 A1 | 4/2012 | Awoniyi et al. |
| 2012/0115471 A1 | 5/2012 | Awoniyi et al. |
| 2012/0236776 A1* | 9/2012 | Zhang .................. H04W 48/12 370/312 |
| 2012/0257522 A1 | 10/2012 | Adachi et al. |
| 2012/0257557 A1 | 10/2012 | Yamazaki et al. |
| 2012/0282942 A1 | 11/2012 | Uusitalo et al. |
| 2012/0307748 A1 | 12/2012 | Cheng et al. |
| 2012/0320810 A1 | 12/2012 | Nourbakhsh |
| 2013/0039294 A1 | 2/2013 | Wang |
| 2013/0083712 A1 | 4/2013 | Sadek et al. |
| 2013/0088983 A1 | 4/2013 | Pragada et al. |
| 2013/0188552 A1 | 7/2013 | Kazmi et al. |
| 2013/0194947 A1 | 8/2013 | Ehsan et al. |
| 2013/0259011 A1 | 10/2013 | Nakashima et al. |
| 2014/0029514 A1 | 1/2014 | Yu et al. |
| 2014/0086173 A1* | 3/2014 | Sadeghi ................. H04L 5/005 370/329 |
| 2014/0134993 A1 | 5/2014 | Kwak et al. |
| 2014/0302856 A1* | 10/2014 | Nory .................... H04W 48/10 455/437 |
| 2014/0307603 A1 | 10/2014 | Barany |
| 2014/0321370 A1 | 10/2014 | Chen et al. |
| 2014/0335858 A1 | 11/2014 | Lee et al. |
| 2014/0355504 A1 | 12/2014 | Du et al. |
| 2015/0004995 A1 | 1/2015 | Koc et al. |
| 2015/0085841 A1 | 3/2015 | Sadek |
| 2015/0189574 A1 | 7/2015 | Ng et al. |
| 2015/0208269 A1 | 7/2015 | Damnjanovic et al. |
| 2015/0215852 A1 | 7/2015 | Gou et al. |
| 2015/0245295 A1 | 8/2015 | Jha et al. |
| 2015/0358094 A1 | 12/2015 | Yi et al. |
| 2016/0081111 A1 | 3/2016 | Yi et al. |

FOREIGN PATENT DOCUMENTS

| | | |
|---|---|---|
| RU | 2011107748 | 9/2012 |
| WO | 2009133444 | 11/2009 |
| WO | 2012173565 | 12/2012 |
| WO | 2015133823 | 9/2015 |

OTHER PUBLICATIONS

European Patent Office Application Serial No. 14857246.4, Search Report dated Apr. 12, 2017, 11 pages.
InterDigital, "Mechanisms for Small Cell On/Off Operation", R1-133392, 3GPP TSG-RAN WG1 Meeting #74, Aug. 2013, 3 pages.
Zeghlache, et al., "TCP Performance over UMTS-HSDPA Systems, section 3.10 Radio Resource Control (RRC)" Jul. 2006, 1 page.
United States Patent and Trademark Office U.S. Appl. No. 15/021,403, Office Action dated Jun. 23, 2017, 21 pages.
United States Patent and Trademark Office U.S. Appl. No. 15/021,403, Final Office Action dated Dec. 29, 2017, 17 pages.
Russian Federation Federal Service for Intellectual Property, Patents and Trademarks Application Serial No. 2016120756/08, Notice of Allowance dated Jun. 21, 2017, 12 pages.
United States Patent and Trademark Office U.S. Appl. No. 15/021,403, Notice of Allowance dated May 16, 2018, 10 pages.
State Intellectual Property Office of the People's Republic of China Application No. 201480058218.0, Office Action dated Jun. 28, 2018, 8 pages.
NTT Docomo, "Views on Small Cell On/Off with Small Cell Discovery", 3GPP TSG RAN WG1 Meeting #74bis, R1-134496, Oct. 2013, 5 pages.
LG Electronics, "Discussions on small cell on/off mechanisms with discovery signals", 3GPP TSG RAN WG1 Meeting #74, R1-133375, Aug. 2013, 3 pages.
Broadcom, "Discussion on Discovery Signals for small Cell On/Off", 3GPP TSG RAN WG1 Meeting #74bis, R1-134589, Oct. 2013, 3 pages.
LG Electronics, "Views on mechanisms for Small cell on/off", 3GPP TSG RAN WG1 Meeting #74bis, R1-134402, Oct. 2013, 12 pages.
3rd Generation Partnership Project (3GPP), "Technical Specification Group Radio Access Network; Small cell enhancements for E-UTRA and E-UTRAN—Physical layer aspects (Release 12)," 3GPP TR 36.872 V12.0.0, Sep. 2013, 4 pages.

\* cited by examiner

METHOD AND APPARATUS FOR WIRELESS COMMUNICATION

CROSS-REFERENCE TO RELATED APPLICATIONS

This application is the National Stage filing under 35 U.S.C. 371 of International Application No. PCT/KR2014/010217, filed on Oct. 28, 2014, which claims the benefit of U.S. Provisional Application No. 61/896,630, filed on Oct. 28, 2013, 61/925,194, filed on Jan. 8, 2014, 62/035,357, filed Aug. 8, 2014 and 62/054,985, filed on Sep. 25, 2014, the contents of which are all hereby incorporated by reference herein in their entirety.

TECHNICAL FIELD

This invention relates to wireless communication, more specifically to techniques for performing cell on/off.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established where one CG can have multiple CCs. Each CC is defined by a single bandwidth and a center frequency.

Recently, in addition to carriers in licensed band, carriers in unlicensed band are also considered for carrier aggregation. In this case, a UE can be configured with zero or more carriers in licensed band and zero or more carriers in unlicensed band. Due to its nature of unlicensed band where the medium is shared by multiple devices and thus continuous transmission is not easily feasible, it is very natural to assume that discontinuous transmission from an eNB operating in unlicensed band. The inventions embodied in this application are applied to carriers in unlicensed band A system in which data is transmitted and/or received in a broadband through a plurality of CCs is referred to as a multi-component carrier system (multi-CC system) or a CA environment. A system in which data is transmitted and/or received in a broadband through a plurality of CGs is referred to as a inter-node resource aggregation or dual connectivity environment. The multi-component carrier system and dual connectivity system perform both a narrow band and a broad band by using one or more carriers. For example, when an each carrier corresponds to a bandwidth of 20 MHz, a bandwidth of a maximum of 100 MHz may be supported by using five carriers.

In this circumstances, different types of cells are used for enhance the performance of wireless communication. For example, user equipment can transmits/receives signals with a plurality of eNB. In this case, network synchronization needs to be considered to enhance channel quality, etc.

SUMMARY OF INVENTION

Technical Problem

An object of the present invention is to provide method and apparatus for effectively performing wireless communication under various circumstances. An another object of the present invention is to provide method and apparatus for receiving and/or transmitting signals when there is a cell which can perform cell on-off.

Another object of the present invention is to provide method and apparatus for processing such as measurement when there is a cell which can perform cell on-off.

Technical Solution

An example of the present invention(s) in this application is a method for wireless communication by a user equipment (UE) with on-off available or discontinuously transmitting cell. The method may comprise receiving signal on downlink channel and processing with the signal on the downlink channel, wherein the signal on the downlink channel includes a discovery signal when the cell is off-state, and wherein the discovery signal is a signal used for cell identification and/or measurement.

Another example of the present invention(s) in this application is a user equipment for wireless communication with on-off available cell. The UE may comprise a radio frequency (RF) unit for transmitting and receiving a signal, and a processor operatively coupled to the RF unit, wherein the processor is configured for transmitting a signal via the RF unit, wherein the processor receives a signal on downlink channel including a discovery signal when the cell is off-state, and wherein the discovery signal is a signal used for cell identification and/or measurement.

Advantageous Effects

According to the present invention, a UE and a eNB perform effectively wireless communication under various circumstances including carriers operated in unlicensed band. According to the present invention, a UE and a eNB perform efficiently receiving and/or transmitting signals when the eNB can perform cell on-off.

According to the present invention, a UE performs effectively processing such as measurement when there is a cell which can perform cell on-off.

MODE FOR INVENTION

Figure 1:
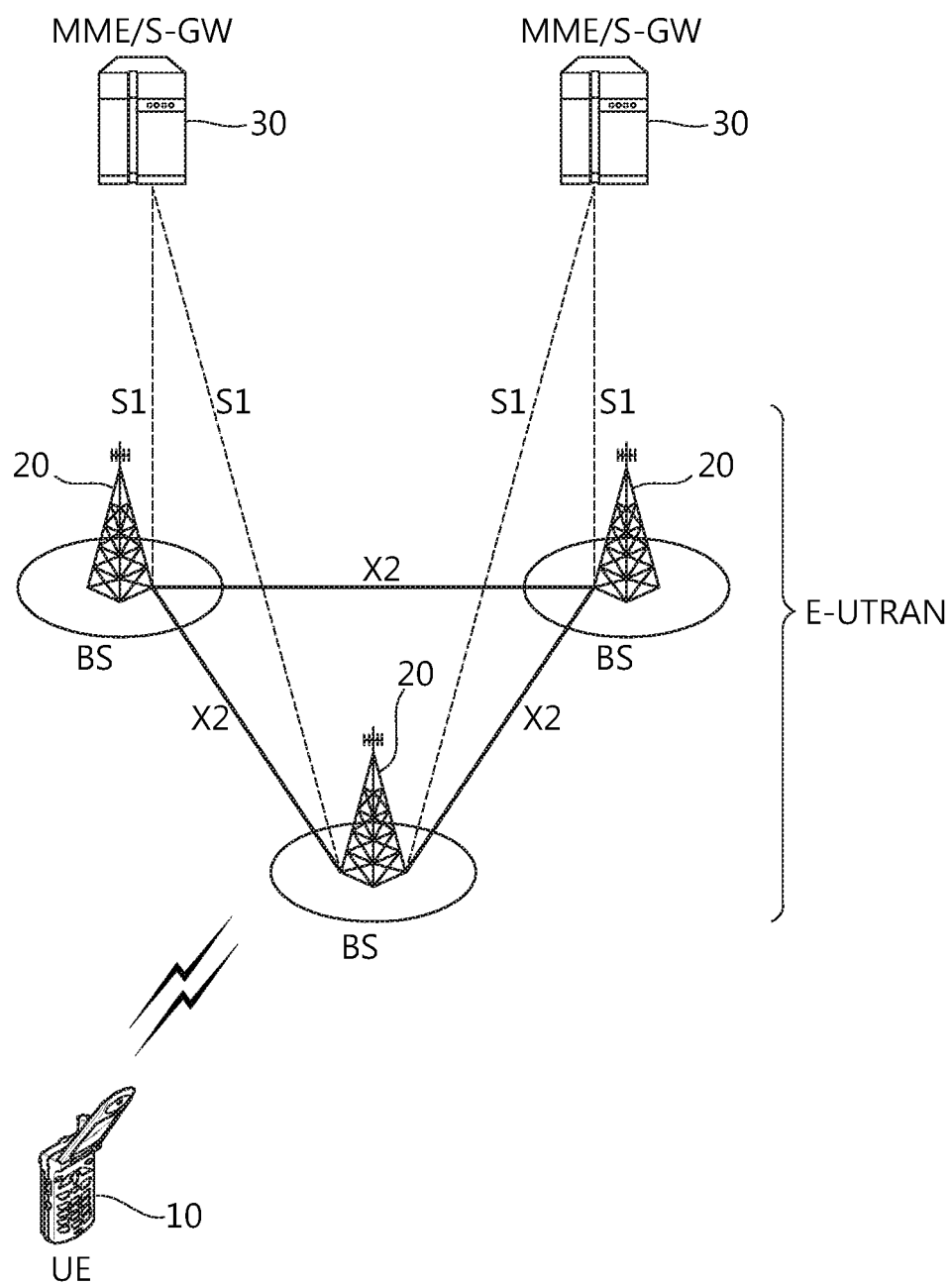
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
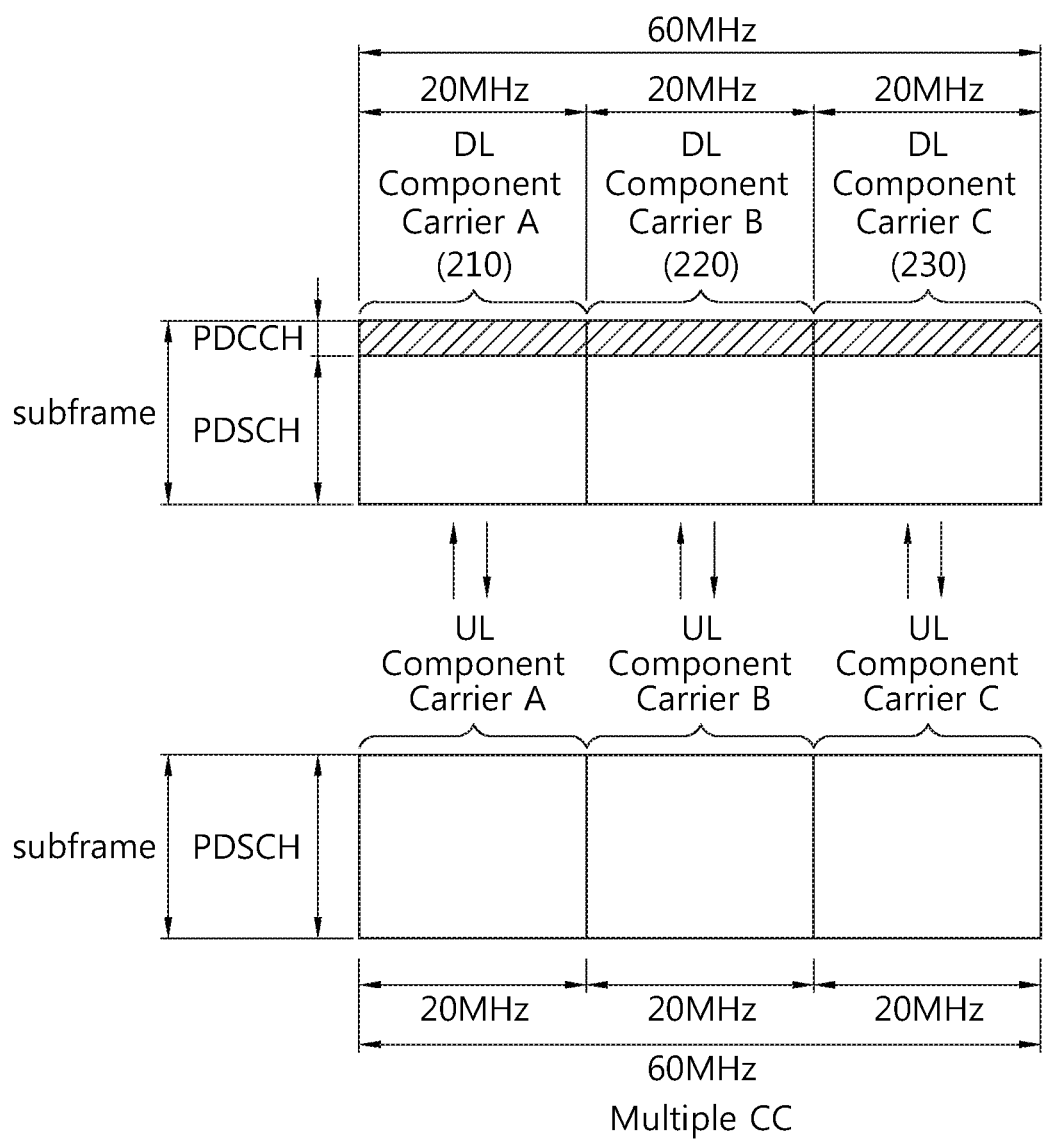
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report channel-quality indicator (CQI)/precoding matrix indicator (PMI)/rank indicator (RI)/procedure transaction identifier (PTI) for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
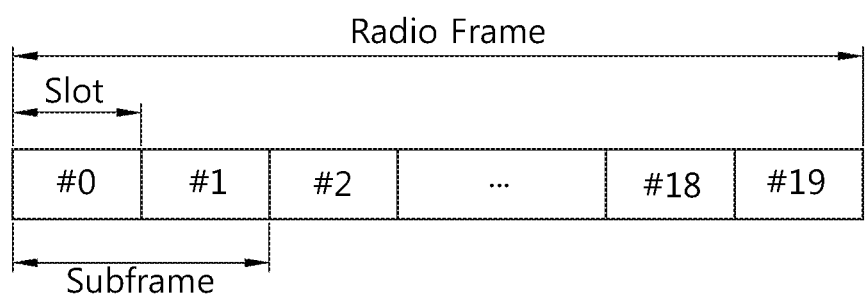
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/

NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. PUCCH format 3 can be used to enable the possibility of transmitting more than four bits in an efficient way, even though PUCCH format 3 also be used for transmitting less four bits of signal. The basis of PUCCH format 3 is DFT (Discrete Fourier Transform)-precoded OFDM. Up to five terminals may share the same resource-block pair for PUCCH format 3 when a length-5 orthogonal sequence is used with each of the five OFDM symbol carrying data in a slot being multiplied by one element of the sequence. A terminal (eNB and/or UE) can be configured with more than one resource (e.g. four different resources) for PUCCH format 3.

Figure 4:
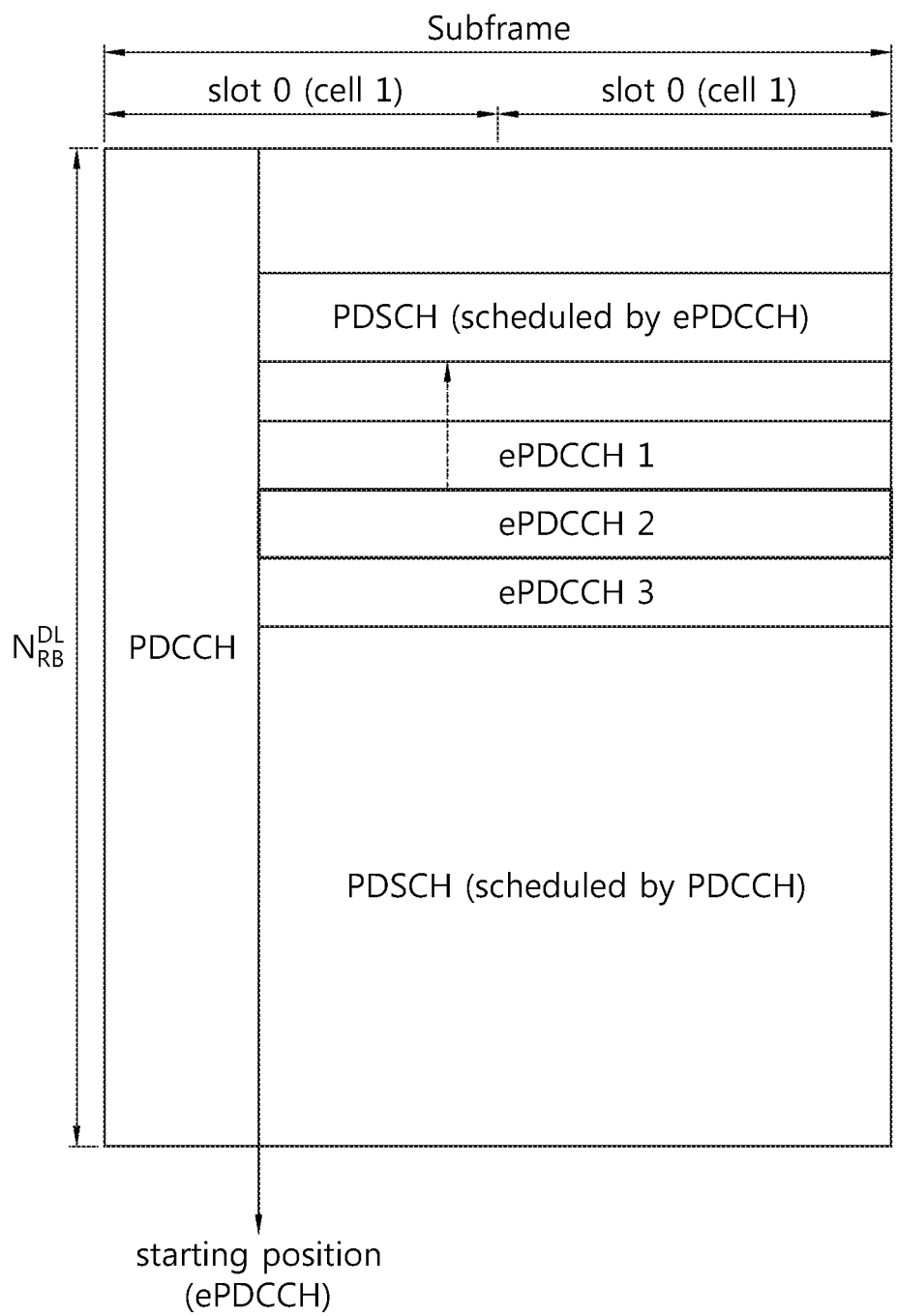
FIG. 4 shows downlink control channels to which the present invention is applied.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

Figure 5:
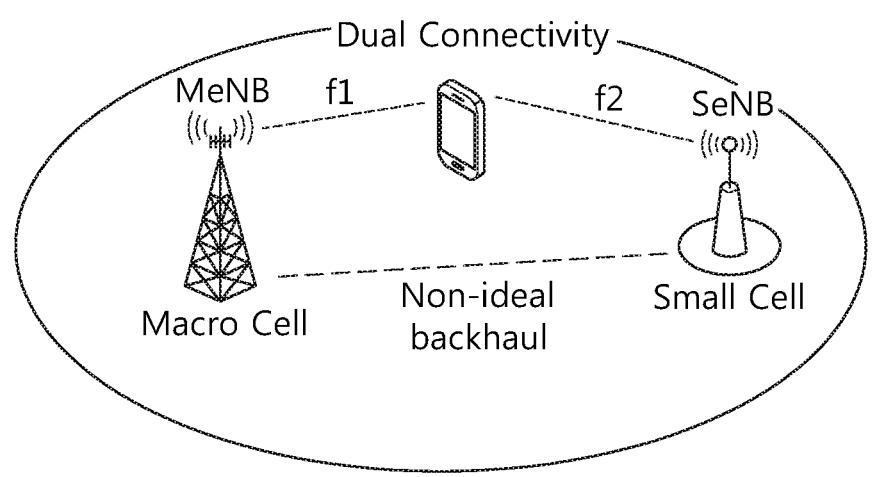
FIG. 5 shows an example of dual connectivity to a macro cell and a small cell.

FIG. 5 shows an example of dual connectivity to a macro cell and a small cell. Referring to FIG. 5, the UE is connected to both the macro cell and the small cell. A macro cell eNB serving the macro cell may be called as a MeNB in dual connectivity, and a small cell eNB serving the small cell may be called as a SeNB in dual connectivity.

The MeNB is an eNB which terminates at least S1-MME and therefore act as mobility anchor towards the core network (CN) in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE) type traffic, while the MeNB may be responsible for transmitting other types of traffic such as VoIP, streaming data, or signaling data.

Figure 6:
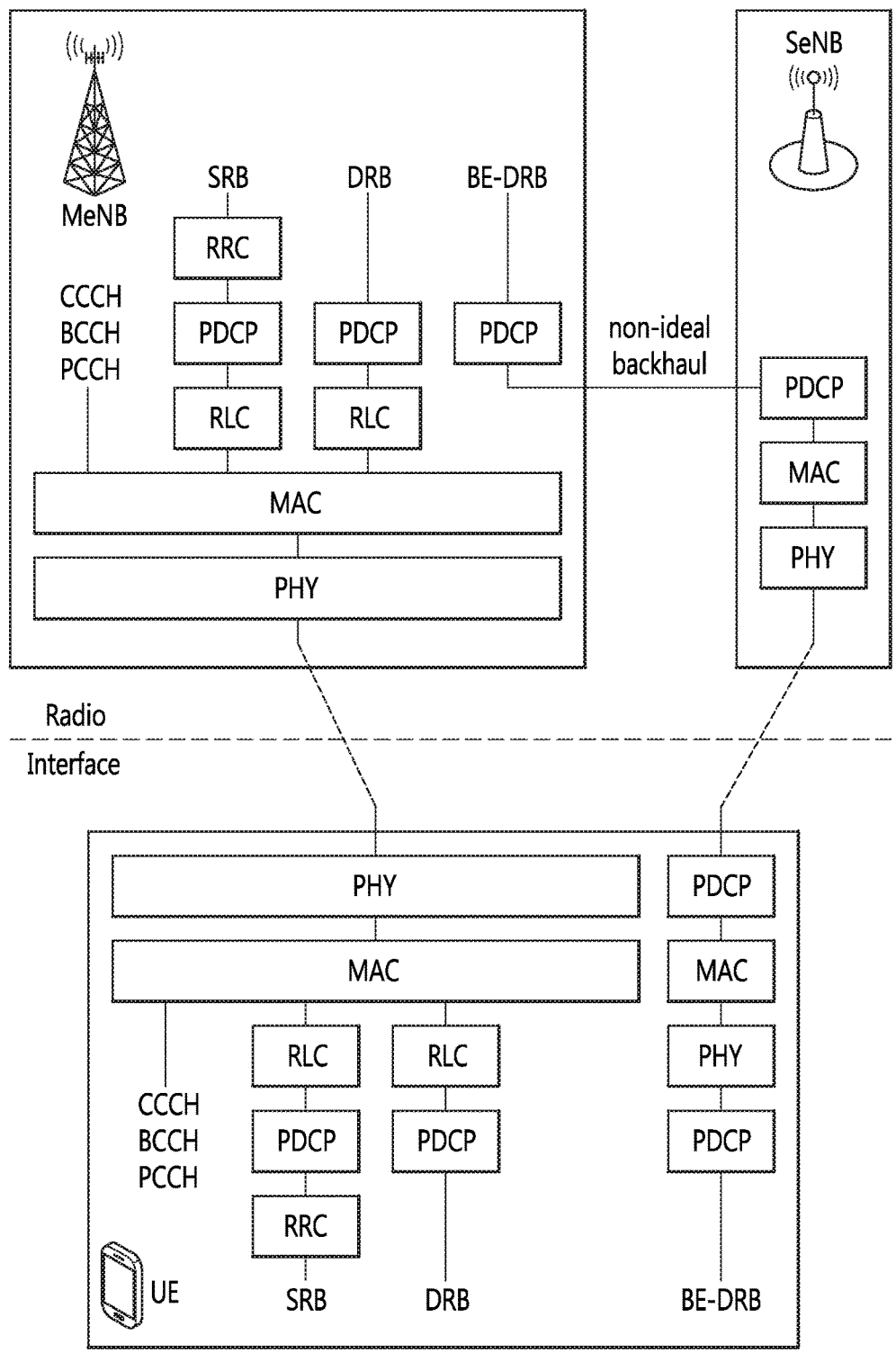
FIG. 6 shows an example of a protocol architecture supporting dual connectivity.

FIG. 6 shows an example of a protocol architecture supporting dual connectivity. To support dual connectivity, various protocol architectures have been studied.

Referring to FIG. 6, PDCP and RLC entities are located in different network nodes, i.e., PDCP entities in the MeNB and RLC entities in the SeNB. In the UE side, the protocol architecture is same as the prior art except that the MAC entity is setup for each eNB (i.e., the MeNB and SeNB).

Meanwhile, a UE may receive signals from more than one cell and transmit signals to more than one cell under some circumstances. For example, the UE may transmit/receive signal with dual connectivity In these cases, a small cell can perform "off" and "on" where "off-state" can be defined as a UE may not expect to receive any other signal except for discovery signals which will be used for cell identification and/or measurement. It is however noted that other signals not used for unicast data transmission can still be present. For example, positioning reference signal (PRS) or PMCH-related signals can still be transmitted. In other words, when the cell is OFF, unicast-related signals may not be transmitted including some system information such as SIB and PBCH. The discovery signal may be cell synchronization/identification signals and/or reference signals for measurement.

Whether the network transmits other signals or not is up to the network. Yet, a UE do not assume that any other signals will be transmitted in off-state unless transmitting of other signal besides the discovery signal configured/indicated/scheduled. Traditionally, a UE may behave based on assumption that eNB will transmit signals continuously. Thus all the protocols such as discontinuous reception (DRX) and paging are based on the assumption that eNB can transmit at least reference signals according to UE receiving time.

Now that a cell can turn on and off its transmission, depending on the level of turning off, there could be cases where a UE may need to know the state of cell-off and thus a UE don't need to expect to receive a set of signals in the off-state.

One example is measurement reference signal (RS) transmission such as CRS where traditionally UE can perform measurement in any subframe whereas, with cell on/off, a UE may be limited to perform measurement in a set of subframes for the measurement or period for the measurement. Otherwise, eNB may need to support those functionalities regardless of cell state (i.e. on/off state of the cell).

Considering a carrier in unlicensed band in which the network may not be able to transmit continuous CRS, it is assumed that the cell will perform on/off in unlicensed band without any additional information. It is however notable that a carrier in unlicensed band may indicate that it will not turn off or it will continuously transmit signals for some reasons. One potential reason is that the channel is idle and the only device utilizing the channel is a LTE eNB. Then, it may indicate it does not require turning off the cell and it will be informed to the UE. When a UE is indicated with this, it can perform measurement/synchronization continuously where the subframes are selected by UE implementation.

The benefit of cell on/off includes both interference reduction and energy saving. In particular, this invention discusses how to handle eNB discontinuous transmission (DTX) and UE DRX effectively.

Overall, from a eNB perspective, four levels (1) to (4) turning off can be considered.

(1) Total shut off where no signal is transmitted in off state (2) Synchronization and measurement signal transmission: Such as primary synchronization signal (PSS)/secondary synchronization signal (SSS)/CRS or discovery signals can be transmitted even in off-state to assist UE measurement and cell identification (3) Transmitting discovery signal+any necessary signals to support RRC_CONNECTED mode UEs such as DRX, paging: Such as PDCCH aligned with UE DRX cycle or paging data or signals for radio link failure (RLF) related measurement may be sent in off-state to assist RRC_CONNECTED mode UE functionality. In RRC_CONNECTED, an RRC context is established. That is, a UE knows the cell to which the UE is belongs and the cell knows an identity of the UE, the Cell Radio-Network Temporary Identifier (C-RNTI), used for signaling purposes between the UE and the network. Thus in RRC_CONNECTED mode, data can be transferred to/from the UE, but DRX can be configured in order to reduce terminal power consumption (4) Transmitting discovery signal+any necessary signals to support both RRC_CONNECTED and RRC_IDLE mode UEs: In this case, transmission system information/MIB, etc. as well as the signals transmitted in above case (3) are supported. In this case, some services such as D2D (Device-to-device) or MBMS can be also supported. If continuous transmission of CRS is needed to support such as MBMS, the cell may transmit CRS continuously. If a subset of signals are needed to support those services, those signals are selectively transmitted. In RRC_IDLE mode, no RRC context is established and the UE does not belong to a specific cell. No data transfer may take place as the UE sleeps most of the time. Uplink transmission may be performed to convert move to RRC_CONNECTED.

In addition to above the four levels of turning off (1)-(4), there is another option to support (3) for advanced UEs and support measurement for legacy UEs. In this option, measurement signals such as CRS should be also transmitted to support legacy UE measurement.

In this invention, main focus is in option (2) and (3). However, the techniques proposed here can be applied to other options as well.

It is also further assumed that eNB may or may not turn off receiver module when it performs DTX. When eNB shuts off the receiver module, it would be informed to UEs so that UE can stop transmission to the eNB. If there is no signaling, UE may assume that eNB would keep the receiver module such that UE can transmit uplink signals any time.

UE, however, may not expect to receive downlink signaling corresponding to the uplink signaling. For example, a UE may transmit physical random access channel (PRACH) where random access response (RAR) may not be expected by the UE when the cell is in off-state. Or, when the cell is in off-state, the latency to acquire response to PRACH may be larger than the latency currently specified. Alternatively, when there is UE uplink transmission, the network automatically wakes-up and responses to UE uplink transmission.

When a cell performs cell on/off, it is expected that a UE with dual connectivity or CA capability can be associated with a on/off cell. In terms of signaling whether the cell is on or off, a few mechanisms can be considered as 1) to 6) as follows.

1) Autonomous detection by UE: A UE may assume that cell is off if CRS and/or PDCCH is not detected at the subframe. Alternatively, a UE can detect predefined signal(s) to indicate the starting time of ON period (such as preamble). When a UE detects the signal, it can assume that the next T msec, the cell would stay in ON-state. Alternatively, a UE may have to detect signal such as CRS or preamble in every subframe to determine the status of the cell.

2) Based on cell association: A UE may assume that a cell is on-state if it is associated with the cell. Otherwise, it shall assume that the cell is off. Particularly, for PCell, a UE can assume that the cell is ON-state.

3) Based on cell activation: A UE may assume that a cell is on-state if the cell is activated. Otherwise, it may assume that the cell is off. If the UE is configured with one or more SCells, the network may activate and deactivate the configured SCells.

The PCell is always activated. The network activates and deactivates the SCell(s) by sending the Activation/Deactivation MAC control element. Furthermore, the UE maintains a sCellDeactivationTimer timer per configured SCell and deactivates the associated SCell upon its expiry.

The same initial timer value applies to each instance of the sCellDeactivationTimer and it is configured by RRC. The configured SCells are initially deactivated upon addition and after a handover.

The UE shall for each TTI and for each configured SCell as below.

If the UE receives an Activation/Deactivation MAC control element in this TTI activating the SCell, the UE shall be in the TTI according to the timing defined in 3GPP TS 36.211. To activate the SCell, i.e. apply normal SCell operation including SRS transmissions on the SCell, CQI/PMI/RI/PTI reporting for the SCell, PDCCH monitoring on the SCell and PDCCH monitoring for the SCell. Start or restart the sCellDeactivationTimer associated with the SCell;

Else, if the UE receives an Activation/Deactivation MAC control element in this TTI deactivating the SCell.

Or if the sCellDeactivationTimer associated with the activated SCell expires in this TTI. In the TTI, the Scell is deactivated, the sCellDeactivationTimer associated with the SCell is stopped, all HARQ buffers associated with the SCell is flushed.

If PDCCH on the activated SCell indicates an uplink grant or downlink assignment; or If PDCCH on the Serving Cell scheduling the activated SCell indicates an uplink grant or a downlink assignment for the activated SCell. The sCellDeactivationTimer associated with the SCell is restarted.

If the SCell is deactivated, SRS on the SCell is not transmitted, CQI/PMI/RI/PTI for the SCell are not reported, UL-SCH on the SCell are not transmitted on, the PDCCH on the SCell is not monitored, the PDCCH for the SCell is not monitored.

4) Based on explicit signaling: A UE may assume that a cell is on or off based on explicit signaling. One example is to introduce a new MAC CE or RRC signaling to indicate the transition of cell state (from off to on or vice versa). Similar to cell activation/deactivation, MAC CE signaling can be introduced to indicate the state of the cell. Upon receiving the MAC CE to indicate cell ON-state, a UE can assume that the cell will be in ON-state until OFF-state indication is received. Another example is to use dynamic signaling such as DCI to indicate whether the cell state has changed or not. In case that explicit signaling has been missed, a UE may assume that a predetermined set of subframes are ON and other subframes are OFF. For that, either via SIB or RRC signaling, a fallback ON-subframes can be configured.

5) Based on cell ID or discovery signals: If a cell uses different discovery signals or IDs per a state (that is a different IDs for on state and off state), by detecting its ID or signals, a UE can determine the state of the cell. Upon detecting "on-state" discovery signals, a UE may assume that it can attempt to read data channels.

6) Based on DRX configuration: A UE may assume that a cell is on-state only in "active state" per DRX configuration.

Except for 6), there could be cases where a UE is configured with DRX cycle where the cell is in off-state. How to handle this case, we can consider a few approaches such as (i)-(v) as follows.

(i) DRX cycle always has higher priority over cell on/off state. In other words, a UE can expect to receive PDCCH/PDSCHs in active-state of each DRX cycle. A UE will monitor active state per DRX protocol to see whether any data has been transmitted.

(ii) DRX cycle is effective only when the cell is on-state. In this case, in active-state of a DRX cycle, if a UE knows that the cell is off-state, it knows that any transmission would not be occurred. So that, it is not required to monitor PDCCH/PDSCHs in those subframes. DRX cycle and timers will not be changed. Only, the UE is not required to monitor PDCCH/PDSCHs in the subframes where the cell is off-state with active-state per DRX cycle.

(iii) DRX is not configured with on/off cell. In this case, a UE shall ignore any configured DRX cycle for a cell performing cell on/off even though it is configured with a DRX cycle. If a UE is configured with PCell and SCell where SCell performs cell on/off, DRX applies only to PCell. This is particularly useful in case where the UE does not know the state of the cell. Yet, it needs to know whether the cell can perform on/off or not. The information where the cell performs on/off can be configured to a UE via measurement configuration or by other higher layer signaling. When a cell changes its state from on/off cells to always-on cells, the information may be reconfigured or updated.

This option is particularly useful for unlicensed band carrier as a UE may not be able to find any signal during DRX OFF and also in onDuration, a UE may not be able to find any signal to receive (E)PDCCH. To handle this issue, a UE may assume that DRX configuration (if configured) is not applicable to unlicensed band carrier(s). It may assume that it does not need to monitor downlink channels by the configuration only.

(iv) Whether to use DRX in SCell or assisting eNB can be configured. If configured to be used, a UE is allowed to operate DRX. In this option, depending on UE knowledge on cell state or not, it can be further assumed that a UE ignore DRX on-duration if the cell is in off-state. Or, if it is configured, UE may assume that DRX operation is supported by the cell.

(v) If a UE supports CA or dual connectivity, it can be assumed that a UE shall monitor PDCCH in PCell for SCell DRX as well where PDSCH/PUSCH can be transmitted via SCell performing on/off using cross-CC scheduling. If a UE supports cross-CC scheduling, a UE may be higher-layer configured to monitor PCell or macro eNB PDCCH in DRX active-state for SCell DRX cycle based on cross-layer scheduling. This approach would be useful as it does not mandate cell on/off performing cell to transmit PDCCHs in off-state to support DRX cycle of UEs. Yet, if the cell is active state which is not known to UE before, the signaling can be transmitted via PCell/macro eNB. In this case, both PCell and SCell (or macro eNB and assisting eNB) transmit PDCCH and only SCell (or assisting eNB) transmits PDSCH at least a few subframes to avoid a case where a UE does not detect PDCCHs in PCell. When a UE detects PDCCH scheduled to itself using cross-subframe scheduling, it starts to run inactivityTimer to decide when to go back to DRX and also it starts monitoring PDCCH on SCell.

Figure 7:
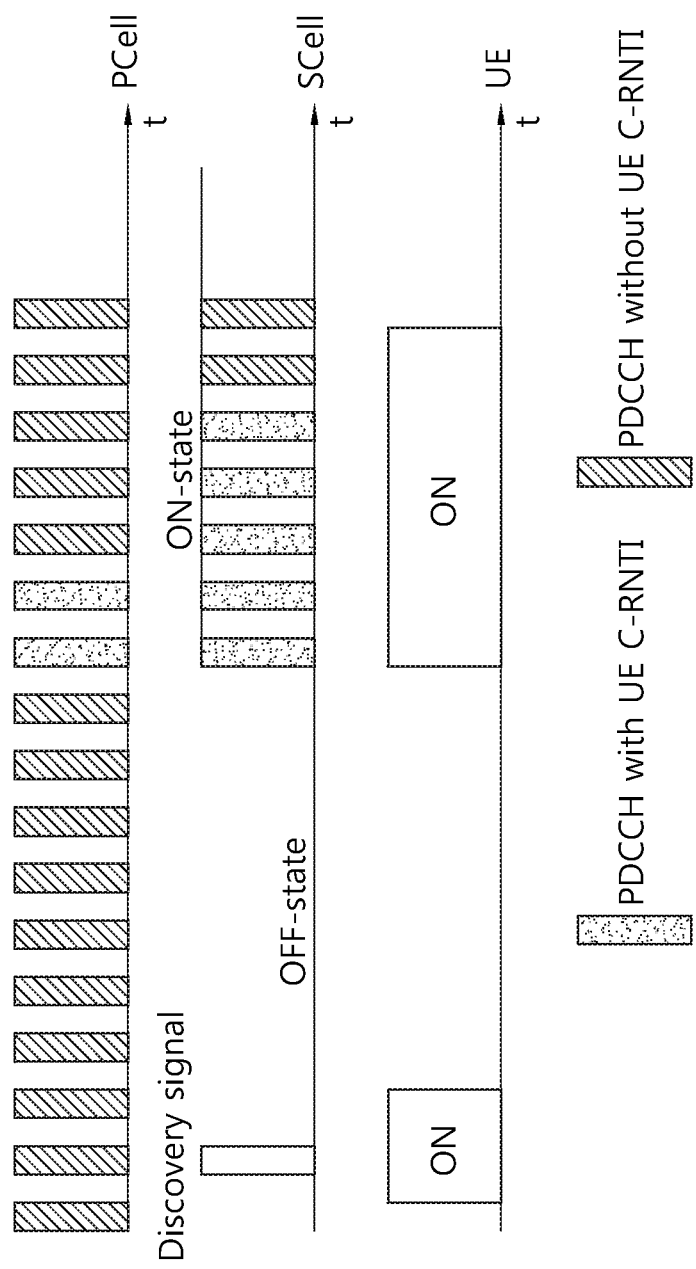
FIG. 7 describes an example of case that transmissions of PCell and SCell according to the present invention.

This option would be useful for unlicensed band carrier. Instead of not applying DRX cycle in unlicensed band, it can also apply DRX in unlicensed band whereas it should not assume that signals will be present in DRX onDuration or activeTime in unlicensed band carrier itself. In this case, onDuration/PDCCH may be monitored only via licensed band carrier(s) such as via PCell? some description is illustrated in FIG. 7. This may be applied even if self-scheduling is configured for unlicensed band carrier.

FIG. 7 describes an example of case (v) above. In the example of FIG. 7, PCell transmits PDCCHs always where PDCCHs for SCell PDSCH/PUSCH can be transmitted in PCell as well. A UE, once detecting PDCCH in on-state, may monitor SCell PDCCHs starting the next subframe.

Alternatively, a DCI transmitted in PCell may be used as an indicator of SCell activity. Once the DCI indicates SCell becomes active, the UE shall start monitoring on SCell.

(vi) UE DRX aligned with cell DTX: In this example, all UEs associated with a cell may be configured with one DRX cycle which is aligned with cell DTX cycle. In the DTX cycle, a UE can monitor PDCCHs in on-duration where the timer reset could be somewhat different from UE-specific DRX as it is a cell-specific DTX cycle. To determine whether on-duration continues or not, a UE may detect either CRS or PDCCH with a new RNTI (such as CELL-ON-RNTI) or PDCCH with C-RNTI.

If a UE detects PDCCH with a new RNTI, it may assume that a cell will be active until inactivityTimer expires. This new RNTI can be cell-specific or group-specific which will be higher layer configured. If a UE detects the activity of a cell based on CRS, the reliability may be decreased and there could be mis-alignment among UEs. To minimize the impact, on-duration should be at least a few msec where a UE will have at least a few opportunities to detect CRS or PDCCH. To allow a UE with mis-alignment between DRX and DTX, a UE without receiving valid CRS or PDCCH for a duration (such as MaxCellOffTime) may assume it is misaligned and indicates the state to the PCell or macro eNB or trigger RLF.

This option could be used in unlicensed band carrier to indicate dynamic on/off operation or discontinuous transmission. It is based on UE blind detection on such as CRS/PDCCH to determine the status of the carrier with a higher layer configured OFF time which can be mapped to back-off duration or idle time between transmissions. When an eNB needs to follow EU regulation, it needs to wait a certain time before the next transmission where no transmission would be occurred. Thus, DRX/DTX cycle can be configured along with that constraint where the cell will transmit signals if channel is acquired based on Listen-Before-Talk (LBT). If this is supported, it may be necessary to configure separate DRX configuration between licensed and unlicensed carrier groups.

Regardless which options used, a UE shall assume that a cell in off-state or when a UE is in DRX state, it should not expect to receive any signal except for discovery signaling (cell synchronization/identification signals and/or measurement signals) and other necessary signals such as PMCH, D2D related signals and PRS.

To handle paging, also, similar approaches can be possible where paging can be delivered to on/off cells or paging can be handled by PCell or other Scell which is not performing cell on/off or the cell with RRC connection. If a cell performing on/off has at least one associated UE which is not capable of CA or dual connectivity, the cell either supports paging regardless of cell state or it may disable paging in a system in this case limited functionality is supported for earthquake and tsunami warning system (ETWS) or Community Modeling and Analysis (CMAS) and thus it may not associate UEs supporting those applications. Furthermore, it could be also desirable not to support UEs without CA or dual connectivity capability. Furthermore, if the paging is supported, a new paging cycle can be also considered which can be aligned with cell on/off period.

Assuming a discovery signal can be used for UE measurement, in terms of UE behavior on measurement can be categorized such as (A) and (B) below.

(A) UE measurement always based on discovery signals: Regardless of cell state, UE shall perform radio resource management (RRM) measurement based on discovery signals. In terms of CSI measurement, if PMI-RI-off, it shall assume that CRS is available in subframes configured to measure CSI. For example, when CSI0 is used for measurement, CSI0 carries CRS.

(B) UE measurement using discovery signal only when cell is not on-state: If a UE knows the state of the cell, it can use the information to enhance the measurement accuracy. For example, if activation/deactivation based cell on/off is used, the UE knows that activated SCell and/or PCell is ON-state. In that case, a UE can use legacy CRS for its measurement on activated SCell and/or PCell.

It is also possible that whether a UE use only discovery signals for its measurement or can use legacy measurement signals on on-state of the cell (or to the neighbor measurement as well) can be configurable. One mechanism of configuration is to configure a list of cells with discovery signals for its measurement such that other cells outside of the cell ID list may be based on legacy signals. Or, if it is configured, a UE shall report two types of measurement when a cell is on-state. For a neighbor cell, unless configured otherwise, discovery-signal based measurement is assumed. If configured, a UE may report additional report based on legacy signals such as PSS/SSS/CRS.

For stand-alone ON/OFF operation, the following operations may be considered.

Radio Link Monitoring

The current requirement on radio link monitoring is as follows: In non-DRX mode operation, the physical layer in the UE shall assess the radio link quality for every radio frame, evaluated over the previous time period defined in 3GPP TS 36.321, 36.101 or 36.104 (hereinafter, 3GPP TS 36.321, 36.101 or 36.104 are called as "the references" in this application) against thresholds ($Q_{out}$ and $Q_{in}$) defined by relevant tests in references. In DRX mode operation, the physical layer in the UE shall assess the radio link quality at least once every DRX period, evaluated over the previous time period defined in the references, against thresholds ($Q_{out}$ and $Q_{in}$) defined by relevant tests in the references. If higher-layer signalling indicates certain subframes for restricted radio link monitoring, the radio link quality shall not be monitored in any subframe other than those indicated. The physical layer in the UE shall in radio frames where the radio link quality is assessed to indicate out-of-sync to higher layers when the radio link quality is worse than the threshold $Q_{out}$. When the radio link quality is better than the threshold $Q_{in}$, the physical layer in the UE shall in radio frames where the radio link quality is assessed to indicate in-sync.

If this requirement is kept, if a UE is not configured with DRX and then the cell can be off, either eNB may inform UE the state so that the requirement changes to one of three alternatives alt1 to alt3 as below.

Alt1 (if a UE knows the state). In non-DRX mode operation and also the cell is not in off-state, the physical layer in the UE shall assess the radio link quality per every radio frame, evaluated over the previous time period defined in the references, against thresholds ($Q_{out}$ and $Q_{in}$) defined by relevant tests in the references.

Alt2 (RLM can be configured). If a UE is configured to perform radio link monitoring (RLM) and in non-DRX mode operation, the physical layer in the UE shall assess the radio link quality per every radio frame, evaluated over the previous time period defined in [10], against thresholds ($Q_{out}$ and $Q_{in}$) defined by relevant tests in the references. In this case, it is assumed that all subframes in non-DRX mode are ON-state.

Alt3 (RLM subframe can be configured). In non-DRX mode operation and in subframes configured to perform radio link monitoring, the physical layer in the UE shall assess the radio link quality per every radio frame, evaluated over the previous time period defined in [10], against thresholds ($Q_{out}$ and $Q_{in}$) defined by relevant tests in the references.

If a UE can be configured with DRX, and some of options listed in this invention applies and then a UE is configured or required to perform radio link monitoring on the cell which performs cell on/off, one of the options (A) to (F) may be used as below.

For DRX, if option (A) may be used: In DRX mode operation, the physical layer in the UE shall assess the radio link quality at least once every DRX period, evaluated over the previous time period defined in the references, against thresholds ($Q_{out}$ and $Q_{in}$) defined by relevant tests in the references.

For DRX, if option (B) may be used: In DRX mode operation, the physical layer in the UE shall assess the radio link quality if a cell is on-state at least once every DRX period, evaluated over the previous time period defined in the references, against thresholds ($Q_{out}$ and $Q_{in}$) defined by relevant tests in the references.

Note that period can be changed to count only DRX episodes where the cell were on-states only. Thus, the latency can be changed if the cell performs cell on/off and can be increased if cell performs frequent on/off.

For DRX, if option (C) may be used: In DRX mode operation, UE ignores DRX mode operation and perform radio link monitoring per non-DRX mode operation.

For DRX, if option (D) is used: In DRX mode operation, if a UE is configured with enabled DRX mode operation in the cell, follow in DRX mode operation such as (a) or (b) otherwise (c) as below.

(a) In DRX mode operation, the physical layer in the UE shall assess the radio link quality at least once every DRX period, evaluated over the previous time period defined in the references, against thresholds ($Q_{out}$ and $Q_{in}$) defined by relevant tests in the references.

(b) In DRX mode operation, the physical layer in the UE shall assess the radio link quality at least once every DRX period if a cell is on-state, evaluated over the previous time period defined in the references, against thresholds ($Q_{out}$ and $Q_{in}$) defined by relevant tests in the references.

(c) In DRX mode operation, UE ignores DRX mode operation and perform radio link monitoring per non-DRX mode operation.

For DRX, if option (E) may be used: In DRX mode operation, the physical layer in the UE shall assess the radio link quality at least once every DRX period if the cell is active, evaluated over the previous time period defined in the references, against thresholds ($Q_{out}$ and $Q_{in}$) defined by relevant tests in the references. Or, in DRX mode operation, the physical layer in the UE may not perform radio link monitoring.

For DRX, if option (F) may be used: In DRX mode operation, the physical layer in the UE may not perform radio link monitoring.

Alternatively, radio link monitoring may be performed solely based on discovery signals and measurement signals which can be transmitted in off and on state.

Also, if a UE is configured with DRX and it knows that the cell may perform cell on/off, it assumes that in DRX operation and DRX cycle in which the cell may not transmit measurement signals. Thus, it should not assume that it can perform measurement in any time. The guaranteed measurement subframes would be subframes carrying discovery and measurement signals transmitted in off-state (as well as in on-state) and/or signals in on-state.

Also, if a UE knows that the cell may perform on/off, it may not be mandated to monitor PDCCH in every subframe. Rather, if a UE knows the active state by either activating the cell or associating the cell, it should assume that PDCCH monitoring is mandated only in subframes configured to do so.

CRS Transmission in ON-State with/without Data Transmission

As it may not be necessary to transmit CRS in certain subframes such as subframes with demodulation reference signals (DM-RS), further optimization to reduce CRS transmission in small cell can be considered. With multiple configurations, a UE per each subframe may determine whether CRS is going to be transmitted or not based on the following configurations.

(1) If a UE is not configured with DRX or the current subframe per DRX configuration is OnDuration (i.e., active subframe):

A. If a UE is configured with EPDCCH and the current subframe is not part of EPDCCH monitoring subframe set (i.e., PDCCH monitoring subframe), then a UE shall assume CRS will be present at least first two OFDM symbols.

i. If a UE is configured with CRS-based transmission mode: If the current subframe is not MBSFN subframe per configuration, UE shall assume that CRS will be present throughout the whole subframe. Otherwise, it shall assume only first two OFDM symbols will carry CRS.

ii. If a UE is configured with DM-RS based transmission mode, if the current subframe is not part of restricted measurement subframe set, it shall assume only first two OFDM symbols will carry CRS. If it does belong to the restricted measurement subframe set, UE shall assume that CRS will be present throughout the whole subframe B. If a UE is configured with EPDCCH and the current subframe is part of EPDCCH monitoring subframe set, i. If a UE expects to receive common-search-space DCI or P-RNTI, SI-RNTI, RA-RNTI, scrambled DCI in the current subframe, it shall assume at least first two OFDM symbols will carry CRS.

ii. If a UE is configured with CRS-based transmission mode: If the current subframe is not MBSFN subframe per configuration, UE shall assume that CRS will be present at least in PDSCH region.

iii. If a UE is configured with DM-RS based transmission mode, if the current subframe belongs to the restricted measurement subframe set, UE shall assume that CRS will be present throughout the whole subframe (2) If a UE is configured with DRX and the current subframe per DRX configuration is not OnDuration (i.e., active subframe): A UE shall not assume CRS will be present in the subframe.

(3) In other cases, a UE shall not assume CRS will be present in a certain OFDM symbol or subframe.

For unlicensed band carrier, it can be assumed that CRS will be transmitted in a subset of subframes where one or a few following conditions i.e. (a)-(f) as below are satisfied.

(a) A UE is configured with CRS-based transmission mode and the subframe is not configured as MBSFN subframe.

(b) A UE is configured with monitoring PDCCH in that subframe (c) A UE is configured to decode PMCH for the serving cell (d) A UE is configured to receive D2D related configuration from the serving cell (e) The subframe is part of DRS subframes (f) The subframe is configured by higher layer as subframe to carry CRS Activation/Deactivation of SCell Process with Cell on/Off When a cell is turned on or off via SCell activation/deactivation command, we can slightly change the timing of SCell activation/deactivation to aid cell on/off procedure.

If a UE is configured with fast cell activation/deactivation (such as via FastCellOnOffActivated is configured as TRUE), a UE shall assume the followings: When a UE receives an activation command the references for a secondary cell in subframe n, the corresponding actions in the references shall be applied no later than the minimum requirement defined in [10], and no earlier than the latency T configured by higher layer, except for the following two actions ① and ②. ① The actions related to CSI reporting and ② the actions related to the sCellDeactivationTimer associated with the secondary cell the references which shall be applied in subframe n+T (n is integer). Note that if T is not configured, default value should be 8. Also note that T should be larger than 8. If small number is configured, UE shall ignore the configuration and set T as T=8. Note that if T is larger than the minimum requirement defined in the references, T has higher priority and thus activation will occur no earlier than T. When a UE receives a deactivation command the references for a secondary cell or the sCellDeactivationTimer associated with the secondary cell expires in subframe n, the corresponding actions in the references shall apply in subframe n, including CSI reporting.

The motivation of having higher layer configured value of T is to allow cell wake-up procedure occurred via backhaul procedure where backhaul delay can be larger than 8 msec (MAC CE delay) which could be in addition to MAC CE delay. The reason of "instantaneous" deactivation is to allow fast turn off procedure of a small cell.

Activation/Deactivation of Super SCell Process with Cell on/Off

When attaching assisting eNB via activation/deactivation procedure, to address backhaul latency, deactivation message may also carry latency value. Different from activation/deactivation procedure listed above, when a UE is deactivated, a UE may also be configured with latency T which may be shared between activation and also deactivation. If latency is applied for deactivation procedure as well, the procedure would be as the following: When a UE receives a deactivation command the references for a secondary cell or the sCellDeactivationTimer associated with the secondary cell expires in subframe n (n is integer), the corresponding actions in the references shall apply in subframe n+T where T is higher layer configured latency value including CSI reporting.

By this means, SeNB may reserve cell off and turn off the cell immediately at the reserved time.

Physical Multicast Channel (PMCH) Reception

A UE shall not assume that eNB may transmit CRS and/or PDCCH in subframes where PMCH reception is occurred unless the carrier is activated as a SCell or super SCell or PCell. In other words, a UE shall not assume that PDCCH/CRS will be transmitted in MBSFN subframes unless the cell is activated and serving cell.

In this case, a UE may still assume that subframes carrying MBMS-related SIBs (such as SIB1/2, SIB13) may transmit CRS/PDCCH. Furthermore, since tracking is needed, transmission of tracking signals such as CRS is assumed as well.

More specifically, not to change the UE behaviour, it can be assumed that if a network indicates the intention of MBMS service in a frequency by a cell, a UE can expect that cells supporting MBMS in that frequency will not turn off. Thus, a UE can expect reading legacy signals from that cell.

This is particularly important even in case of discovery signal measurement is configured. Even if discovery signal measurement is configured, it is expected that a UE can assume the cell is maintaining ON state if the cell indicates MBMS service. Thus, a UE can expect signals from the cell. In other words, a UE can expect that the cell maintains ON-state if it is configured by higher layer to decode PMCH for the cell even though the cell is deactivated SCell.

Similarly, for device-to-device (D2D) operation, if a network indicates D2D operation in that frequency, a UE may assume that the network will not perform cell on/off regardless of cell activation/deactivation. Thus, a UE can assume certain signals in case of D2D operation is configured by the cell.

It is however notable that unlicensed band, even with MBMS, CRS/PDCCH transmission may not be assumed. Rather, MBMS-related configuration may be delivered via PCell or licensed carrier instead of acquiring from unlicensed band carrier itself. It is also notable that MBMS service can be occurred in any subframe regardless of MBSFN configuration in unlicensed band carrier.

MBSFN Configuration

Now that a cell may perform on/off operation, during off-state, a cell may be able to utilize all subframes as MBSFN subframes for MBMS. Thus, MBSFN subframe configuration can be extended to cover all subframes in a radio frame. At least off-state or unlicensed band carrier, all subframes could be used for MBMS transmission. From a UE perspective, when a carrier is activated, all subframes may not be usable for MBSFN subframes.

In this case, additional MBSFN subframe configuration can be configured via higher layer signaling if necessary.

Otherwise, UE may assume that subframe #0/#4/#5/#9 in FDD are reserved for downlink data transmission or CRS transmission or UE may assume that subframe #0/#5 in FDD are reserved for CRS transmission and thus those reserved subframes may not be usable for MBSFN subframes when the carrier is activated even though MBSFN subframe configuration via SIB or higher layer signaling indicates otherwise.

For TDD, subframe #0/#1/#5/#6 may be reserved for CRS or subframe #0/#5 may be reserved for potential CRS transmission. Moreover, a UE may assume that subframes configured for discovery signal transmission are not MBSFN subframes regardless of MBSFN configuration. Optionally MBSFN subframe configuration can be omitted in such case a UE may assume that all subframes can be used for MBSFN subframes when cell is off-state.

Discovery Signal Scrambling Sequence

To allow super dense small cell environment, it is desirable to increase the number of cell IDs in a hierarchical fashion such as cluster ID and cell ID may be used jointly. For example, instead of 10 bits of cell ID, 14 bits of ID can be used where cluster ID (4 bits)+cell ID (10 bits) can be used.

The intention is to create unique ID from any UE perspective and also from the network perspective. It is important to have a unique ID from the network perspective as well since a UE may report measurement results based on ID and the network should be able to differentiate cells which may have the same cell ID due to the lack of pre-planning via separating clusters.

In other words, cell ID can be used within a cluster and cluster ID can be used across the clusters to assign unique IDs. This is particularly important with cell on/off scenarios where cells are densely deployed and use the same cell ID for UE-centric virtual cell formation. Also, discovery signal may be transmitted to UEs without knowledge of subframe number or SFN, thus, scrambling may be occurred without slot or subframe or radio frame number. One example of scrambling sequence initialization using CSI-RS for discovery signal is as MTH 1

$$c_{init}=2^{10}\cdot(7\cdot(N_{ID}^{Cluster}+1)+l+1)\cdot(2\cdot N_{ID}^{CS}+1)+2\cdot N_{ID\text{-}CSI}+N_{CP} \quad \text{<MATH 1>}$$

Consideration of Explicit Indication of Cell ON/OFF

When explicit signalling is used, some issues related to periodicity and fallback issue need to be considered. For example, explicit signalling can be transmitted every 5 msec/10 msec at a set of fixed subframes (such as subframe #0, #5).

Explicit DCI can be transmitted via cross-carrier scheduling from PCell for example, or self-scheduling from SCell. If cell-common DCI is used, it would be good to utilize cell-common search space (CSS), thus, it can be considered to assume cross-carrier scheduling from PCell.

When ON/OFF indication DCI is missing, it is necessary to define a fallback behaviour. One simple approach is to assume that all subframes are "OFF" if valid DCI has not been successfully detected at a given indication subframe. Another approach is to assume all subframes are "ON". Alternatively, it can be assumed that a set of subframes are assumed to be "ON" regardless of ON/OFF operation/DCI.

When ON/OFF indication is sent from PCell, it is necessary to contain the information of SCell information. One approach is to include cell ID and the bitmap of ON/OFF pattern, or a mapping between ON/OFF indication DCI to a cell needs to be defined. Similar to enhanced interference management and traffic adaptation (eIMTA), it can be also considerable that ON/OFF can be applied for multiple carriers, and thus, ON/OFF indication per carrier can use 1 or 2 bits per each carrier where the mapping between the order of ON/OFF indication DCI (which contains ON/OFF indication for multiple carriers) and the cell can be configured by higher layer.

If bitmap is used, four bits of bitmap can be considered if periodicity of ON/OFF indication is transmitted in every 5 msec where subframe #0/#5 may be assumed as "ON" regardless of ON/OFF indication. Four bits for each carrier which can perform ON/OFF can be sent via a DCI.

Even in case of DCI missing, a UE may still assume that PHICH-expected subframes are "ON"-subframes. In unlicensed band, a UE may assume that all subframes are potentially OFF. When a UE sends PUSCH, the corresponding downlink subframe (PHICH-subframe) is assumed as ON subframe regardless of ON/OFF indication.

If a set of predetermined/higher layer configured subframes is assumed to be "ON" regardless of ON/OFF indication, the UE may perform RRM measurements only in those subframes unless configured otherwise via restricted measurement or other means such as discovery signals. Furthermore, it can be also assumed that RLM is performed in those subframes only unless configured otherwise.

Figure 8:
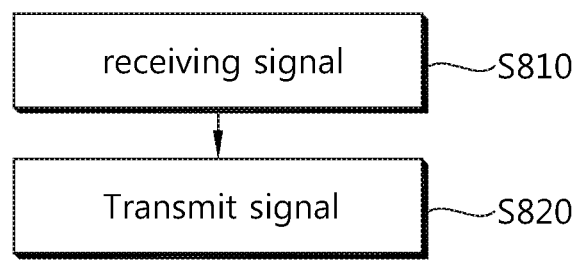
FIG. 8 is a flowchart briefly describing an example of operation of a UE according to the invention(s) in this application.

FIG. 8 is a flowchart briefly describing an example of operation of a UE according to the invention(s) in this application.

Referring to FIG. 8, the UE receives signal from a cell on downlink channel at step S810. Here, the cell may perform cell on-off. When the cell is in off-state, the UE may receive signal including discovery signal from the cell.

The UE may determine whether the cell is in off-state or in on-state using one of the methods described before. When the UE determined that the cell is in off-state, the UE may process on the signal (e.g. discovery signal) in consideration that the cell is in off-state.

The received signals, the determination and assumption as to cell on/off and process considering cell on/off were described in tail.

The UE transmits signal on uplink channel at step S820. The UE may transmit signal based on the determination as to whether the cell is in off-state or not. The detailed descriptions as to this are same as provided before.

Figure 9:
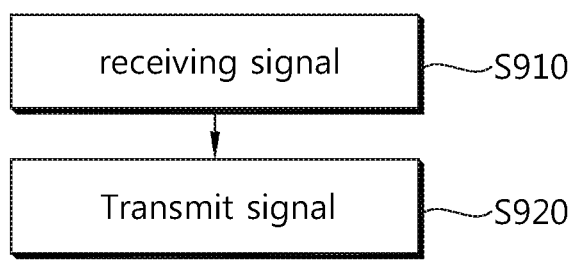
FIG. 9 is a flowchart briefly describing an example of operation of a eNB (BS) according to the invention(s) in this application.

FIG. 9 is a flowchart briefly describing an example of operation of a eNB (BS) according to the invention(s) in this application.

Referring to FIG. 9, the eNB receives signal from a UE on uplink channel at step S910. Here, the eNB may perform cell on/off. The eNB may receive signals such as reports on measurement with reference signal from the UE.

However, the cell may be in off-state.

The eNB transmit signals to the UE on downlink channel at step S920. When the eNB is in off-state, the eNB may transmit signal under predetermined condition as described before. The eNB may notice its state (i.e. in off-state or in on-state) to the UE by signalling or the state of the eNB may be indicated to the UE by blind detection. In addition, the signal from the eNB in off-state may be restricted in signalling type, signalling timing, channel to be transmitted, number of signalling, information in the signal, etc. The details are same as described before.

Figure 10:
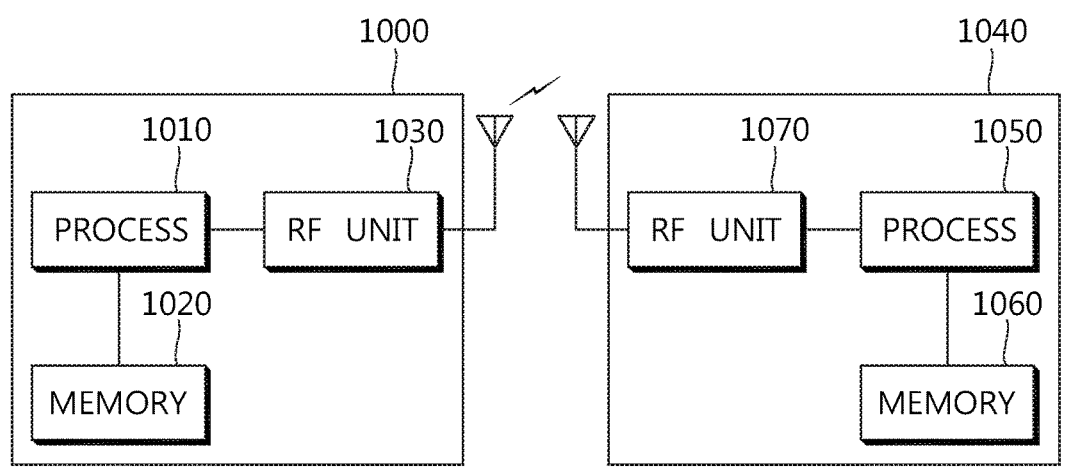
FIG. 10 is a block diagram which briefly describes a wireless communication system.

FIG. 10 is a block diagram which briefly describes a wireless communication system including an UE 1000 and a BS (eNB) 1040. The UE 1000 and the BS 1040 may operate based on the description as explained above.

In view of downlink, a transmitter may be a part of the BS 1040 and a receiver may be a part of the UE 1000. In view of uplink, a transmitter may be a part of the UE 1000 and a receiver may be a part of the BS 1040.

Referring to FIG. 10, the UE 1000 may include a processor 1010, a memory 1020 and a radio frequency (RF) unit 1030.

The processor 1010 may be configured to implement proposed procedures and/or methods described in this application. For example, the processor 1010 may determine whether the BS (cell) is in off-state or in on-state based on signals, blind detection, etc. The processor 1010 may perform measurement under consideration that the BS may be in off-state. The detailed description on the processor 1010 is the same in much of the operation of the UE described above.

The memory 1020 is coupled with the processor 1010 and stores a variety of information to operate the processor 1010, which includes data information and/or control information.

The RF unit 1030 is also coupled with the processor 1010. The RF unit 1030 may transmit and/or receive a radio signal. The signal may include a discovery signal when the signal is transmitted from the eNB in off-state.

The BS 1040 may include a processor 1050, a memory 1060 and a RF unit 1070. Here, the BS may be PCell or SCell and the BS may be a macro cell or small cell. In addition the BS may be a source cell for network synchronization or a target cell for network synchronization.

The processor 1050 may be configured to implement proposed procedures and/or methods described in this application. For example, the processor 1050 may perform cell on/off. The processor 1050 may transmit/receive signal under certain condition when the eNB (cell) is in off-state. For example, the eNB may transmit a discovery signal only when the eNB is in off-state. The details are already described before in this application.

The memory 1060 is coupled with the processor 1050 and stores a variety of information to operate the processor 1050, which includes data information and/or control information. The RF unit 1070 is also coupled with the processor 1050. The RF unit 1070 may transmit and/or receive a radio signal. The signals transmitted or received via the RF unit 1070 are also described before.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method for performing a measurement in a wireless communication system, the method performed at a user equipment (UE) and comprising:
determining whether the UE is expected to receive Multimedia Broadcast/Multicast Service (MBMS) on a cell supporting the MBMS, wherein the cell switches between an 'on-state' and an 'off-state;'
if the UE is expected to receive the MBMS on the cell supporting the MBMS and if the cell is switched to the 'on-state', receiving one or more legacy signals from the cell;
if the UE is not expected to receive the MBMS on the cell supporting the MBMS and if the cell is switched to the 'off-state', receiving one or more discovery signals from the cell,
wherein the UE does not receive any signal, which is used for cell identification or radio resource measurement, other than the one or more discovery signals during a duration associated with the 'off-state;' and
performing the measurement by using the one or more discovery signals.

2. The method of claim 1, wherein the one or more discovery signals are used for the cell identification or the radio resource measurement.

3. The method of claim 1, wherein if the UE is expected to receive the MBMS on the cell, the UE does not receive a cell specific reference signal (CRS) during a duration associated with the 'on-state'.

4. The method of claim 1, wherein if the UE is expected to receive the MBMS on the cell, the UE does not receive a physical downlink control channel (PDCCH) during a duration associated with the 'on-state'.

5. The method of claim 1, wherein a higher layer signal from the cell indicates whether the UE is expected to receive the MBMS on the cell.

6. The method of claim 1, further comprising:
reporting a result of the measurement; and
after reporting the measurement result, receiving data on the cell after the cell shifts to the 'on-state'.

7. A user equipment (UE) for performing a measurement in a wireless communication system, comprising:
a radio frequency unit receiving a signal;
a processor coupled to the radio frequency unit and configured to:
determine whether the UE is expected to receive Multimedia Broadcast/Multicast Service (MBMS) on a cell supporting the MBMS, wherein the cell switches between an 'on-state' and an 'off-state;'
if the UE is expected to receive the MBMS on the cell supporting the MBMS and if the cell is switched to the 'on-state', receive one or more legacy signals from the cell;
if the UE is not expected to receive the MBMS on the cell supporting the MBMS and if the cell is switched to the 'off-state', receive one or more discovery signals from the cell;
wherein the UE does not receive any signal, which is used for cell identification or radio resource measurement, other than the one or more discovery signals during a duration associated with the 'off-state;' and
perform the measurement by using the one or more discovery signals.

8. The UE of claim 7, wherein the one or more discovery signals are used for the cell identification or the radio resource measurement.

9. The UE of claim 7, wherein if the UE is expected to receive the MBMS on the cell, the UE does not receive a cell specific reference signal (CRS) during a duration associated with the 'on-state'.

10. The UE of claim 7, wherein if the UE is expected to receive the MBMS on the cell, the UE does not receive a physical downlink control channel (PDCCH) during a duration associated with the 'on-state'.

11. The UE of claim 7, wherein a higher layer signal from the cell indicates whether the UE is expected to receive the MBMS on the cell.

12. The UE of claim 7, wherein the processor is further configured to: report a result of the measurement; and
after reporting the measurement result, receive data on the cell after the cell shifts to the 'on-state'.

* * * * *